US00RE34361E

United States Patent [19]

Pratt

[11] E Patent Number: Re. 34,361

[45] Reissued Date of Patent: Aug. 31, 1993

[54] UTILITY BAG

[76] Inventor: Michael J. Pratt, 678 Angie Cir., Midvale, Utah 84047

[21] Appl. No.: 827,837

[22] Filed: Jan. 29, 1992

Related U.S. Patent Documents

Reissue of:

[64] Patent No.: 4,752,008
Issued: Jun. 21, 1988
Appl. No.: 85,179
Filed: Aug. 14, 1987

U.S. Applications:

[63] Continuation of Ser. No. 541,717, Jun. 21, 1990, abandoned.

[51] Int. Cl.[5] ..... B65G 69/00; A45C 3/00

[52] U.S. Cl. ..... 206/579; 190/109; 190/110; 190/113; 206/315.1; D3/76

[58] Field of Search ..... 190/111-113, 190/122, 127, 103, 109, 13 R; 150/117; D3/36, 42, 48, 51, 52, 76, 78, 79

[56] References Cited

U.S. PATENT DOCUMENTS

| | | | |
|---|---|---|---|
| D. 151,950 | 12/1948 | Anderson | D87/3 |
| D. 227,946 | 7/1973 | Milette | D3/1 |
| D. 238,010 | 12/1975 | Canton | D3/2 |
| D. 243,637 | 3/1977 | Rabinowitz | D3/2 |
| D. 262,072 | 12/1981 | Pfeiffer | D3/36 |
| D. 265,268 | 7/1982 | Plough et al. | D3/48 |
| D. 270,873 | 10/1983 | Katz et al. | D3/71 |
| 782,047 | 2/1905 | Pearson | 190/112 |
| 866,459 | 9/1907 | Gray | 190/111 |
| 896,529 | 8/1908 | Gray | 190/111 X |
| 1,175,478 | 3/1916 | Shaw . | |
| 1,600,909 | 5/1926 | Seward . | |
| 1,606,368 | 11/1926 | Horton | 190/13 R |
| 1,667,014 | 4/1928 | Snell | 190/122 X |
| 1,930,043 | 10/1933 | Evens | 190/41 |
| 2,180,191 | 11/1939 | Bauch | 190/111 |
| 2,282,409 | 5/1942 | Lowe | 190/127 X |
| 2,316,716 | 4/1943 | Ries | 190/41 |
| 2,318,527 | 5/1943 | Rosenthal | 190/122 X |
| 2,552,438 | 5/1951 | Kramer | 190/111 |
| 2,585,745 | 6/1948 | Crosby | 190/52 |
| 2,631,632 | 3/1953 | Leachman | 150/34 |
| 2,861,661 | 11/1958 | Heitler | 190/122 |
| 2,988,125 | 6/1958 | Reynolds | 150/52 |
| 3,186,529 | 6/1965 | Gilbert | D3/76 |
| 3,396,832 | 8/1968 | Bloom et al. | D3/76 X |
| 3,506,112 | 4/1970 | Feinberg et al. | 206/8 |
| 3,963,103 | 6/1976 | Cowen | 190/52 |
| 4,063,581 | 12/1977 | William | D3/36 X |
| 4,210,186 | 7/1980 | Belenson | 150/52 |
| 4,210,230 | 7/1980 | Weiner | 190/127 X |
| 4,334,601 | 6/1982 | Davis | 190/44 |
| 4,544,051 | 10/1985 | Saltz | 190/127 X |
| 4,733,759 | 3/1988 | Shih-Chen | 190/103 X |
| 4,752,008 | 6/1988 | Pratt | 206/579 |
| 4,805,749 | 2/1989 | Gerch | 190/111 |

FOREIGN PATENT DOCUMENTS

| | | | |
|---|---|---|---|
| 646926 | 11/1928 | France | 190/109 |
| 930251 | 1/1948 | France | 190/109 |

*Primary Examiner*—Bryon P. Gehman

*Attorney, Agent, or Firm*—Workman Nydegger and Jensen

[57] ABSTRACT

A utility bag which is generally rectangular in shape and size to fit into an athletic locker or under the seat of an airplane. [The] *A preferred embodiment of the* utility bag comprises:

(a) a pair of transversely positioned, generally rectangular, rigid frame members longitudinally spaced apart within the interior of the bag;

(b) a fabric side panel having a width such that the forward and rearward edges of the side panel extend beyond the opposing outside edges of the frame members respectively, with the side panel tautly enveloping the frame members on the outside surfaces thereof to form contiguous top wall, bottom wall and sidewalls of the utility bag;

(c) a generally rectangular fabric end panel attached at its edges to the rearward edges of the side to form a closed rear end wall of the utility bag;

(d) an outwardly swinging, generally rectangular fabric door attached in hinge-like fashion along one elongate edge thereof to a forward side wall edge of a side panel of the utility bag; and (e) an interengaging zipper closure means attached to the remaining edge portions of the forward edge of the side panel and the other three side edges of the rectangular fabric door for releasably securing the fabric door in a closed position to the otherwise open, front end of the utility bag.

26 Claims, 2 Drawing Sheets

UTILITY BAG

Matter enclosed in heavy brackets [ ] appears in the original patent but forms no part of this reissue specification; matter printed in italics indicates the additions made by reissue.

*This application is a continuation of U.S. application Ser. No. 07/541,717, filed Jun. 21, 1990, for UTILITY BAG, now abandoned, which is a reissue of U.S. Pat. No. 4,752,008, issued Jun. 21, 1988 for UTILITY BAG.*

BACKGROUND OF THE INVENTION

1. Field of the Invention

The present invention relates generally to utility bags for carrying clothing and other items. In particular, the present invention relates to utility bags which are generally rectangular in shape and sized to fit into an athletic locker or under the seat of an airplane.

2. State of the Art

Utility bags for carrying clothing and other items are well known, and such bags have come in various sizes and shapes. Utility bags have been commonly used as carry on bags for airline travel. In addition, another major use for utility bags is carrying athletic clothing and equipment. A patent search developed the following U.S. patents which are relevant to the present invention:

Feinberg et al: U.S. Pat. No. 3,506,112, issued Apr. 14, 1970.

Leachman: U.S. Pat. No. 2,631,632, issued Mar. 17, 1953

Shaw; U.S. Pat. No. 1,175,478, issued Mar. 14, 1916

Katz et al: U.S. Pat. No. D. 270,873, issued Nov. 24, 1983

Plough: U.S. Pat. No. D. 265,268, issued Jul. 6, 1982

Pfeiffer: U.S. Pat. No. D. 262,072, issued Dec. 1, 1981

Rabinowitz: U.S. Pat. No. D. 243,637, issued Mar. 8, 1977

Canton: U.S. Pat. No. D. 238,010, issued Dec. 9, 1975

Milette: U.S. Pat. No. D. 227,946, issued Jul. 24, 1973

Anderson: U.S. Pat. No. D. 151,950, issued Dec. 7, 1948.

The bags of the prior art generally either open from the tops thereof, or open into two equal halves about a vertical hinge axis, or have one of the larger broad sides thereof pivot open about a horizontal hinge axis positioned in the bottom floor of the bag. Heretofore, there has been no disclosure of a utility bag capable of carrying clothing as gym clothes, towels, shoes, personal grooming items, and sports apparatus such as tennis rackets, wherein the bag has a generally rectangular shape, has one of its smaller, rectangular, sides adapted to be pivotally opened about a vertical axis in one of the larger, rectangular sides, and is sized to fit conveniently into an athletic locker or under the seat of an airplane.

3. Objectives

A principal objective of the invention is to provide a novel utility bag formed of fabric exterior sides, with the bag being adapted for carrying clothing, such as gym clothes, towels, shoes, as well as personal grooming items, and sports apparatus such as rackets, balls, etc., wherein the bag has a generally rectangular shape, has one of its smaller, rectangular, end sides adapted to be pivotally opened about a vertical axis in one of the larger, rectangular, broad sides, and is sized to fit conveniently into an athletic locker or under the seat of an airplane.

Another objective of the present invention is to provide such a novel utility bag having its front opening door formed by spaced, rectangular, fabric panels which are separated by relatively narrow, perimeter, fabric panels such that an enclosed pouch is formed in the door, with the pouch having an access through the top of the door for receiving such items as wet swim trunks, damp towels, etc. A further objective of the present invention is to provide such a novel utility bag having a plurality of pockets located on the inner face of the front opening door, i.e., the face of the door which faces the inside of the bag when the door is closed, wherein the pockets are adapted to hold various grooming items.

A still further objective of the present invention is to provide such a novel utility bag having an interior shelf which can be folded to a position lying along an inside wall of the bag or can be positioned horizontally in the interior of the bag such that the interior of the bag is divided into two compartments, with the upper compartment being suitable for accommodating clothing, towels, etc., while the lower compartment is suitable for holding shoes and other items which are desirably maintained out of contact with the clothing and other items in the upper compartment.

An additional objective of the present invention is to provide such a novel utility bag having a lightweight, internal framework comprising a pair of spaced, substantially rectangular, rigid frame members combined with elongate, upper and lower, generally U-shaped, stiffener sheets positioned between the upper and lower sides of the frame members, such that the fabric exterior sides of the bag are maintained in a rectangularly-shaped, substantially taut condition.

BRIEF DESCRIPTION OF THE INVENTION

The above objectives are achieved in accordance with the present invention by providing a novel utility bag which is generally reactangular in shape, is formed of shaped, fabric, exterior panels and is sized to conveniently fit into an athletic locker or under the seat of an airplane.

The utility bag comprises pair of transversely positioned, generally rectangular, rigid frame members which are spaced longitudinally apart to form a forward frame member and a rearward frame member of the bag. Each frame member has parallel, elongate sides of equal longitudinal dimensions. The upper ends of the elongate sides are contiguous with an upper, elongate side component of the respective frame member, and the lower ends are contiguous with a lower, elongate side component of the frame member. The upper and lower side components of the respective frame members are substantially parallel with each other and have substantially the same longitudinal dimensions, with the longitudinal dimensions of the upper and lower side components being somewhat shorter than the corresponding, longitudinal dimensions of the sides of the frame member.

The sides of the utility bag are in a preferred embodiment of the invention, formed from a fabric side panel which has a width such that the forward and rearward edges of the side panel extend beyond the opposing, outside edges of the longitudinally spaced, respective frame members. The side panel forms a taut envelope about the frame members encircling the outside surfaces thereof. The opposing ends of the encircling side panel meet each other are joined together therealong across the width of the panel. The encircling side panel thus form a contiguous top wall, bottom wall and opposite side walls of the bag, with the top wall being substantially parallel with the bottom wall and with the opposing sidewalls being substantially parallel with each other and generally perpendicular to the top wall and bottom wall.

A generally rectangular, fabric, end panel is attached at its edges to the rearward edges of the side panel that encircles the frame members. The end panel forms a closed, rear, end wall of the utility bag. An outwardly swinging, generally rectangular, fabric door is attached in hinge-like fashion along one elongate edge thereof to a sidewall edge of the forward edge of the side panel to form a hinged door for the front of the utility bag. An interengaging zipper closure means is preferably attached to the remaining edge portions of the forward edge of the side panel and the other three side edges of the rectangular, fabric door for releasably securing the door in a closed position to the front edges of the top, bottom and side panels of the bag.

Additional objects and features of the invention will become apparent from the following detailed description, taken together with the accompanying drawings.

THE DRAWINGS

Preferred embodiments of the present invention representing the best mode presently contemplated of carrying out the invention are illustrated in the accompanying drawings in which.

DETAILED DESCRIPTION OF THE ILLUSTRATED EMBODIMENT

Figure 1:
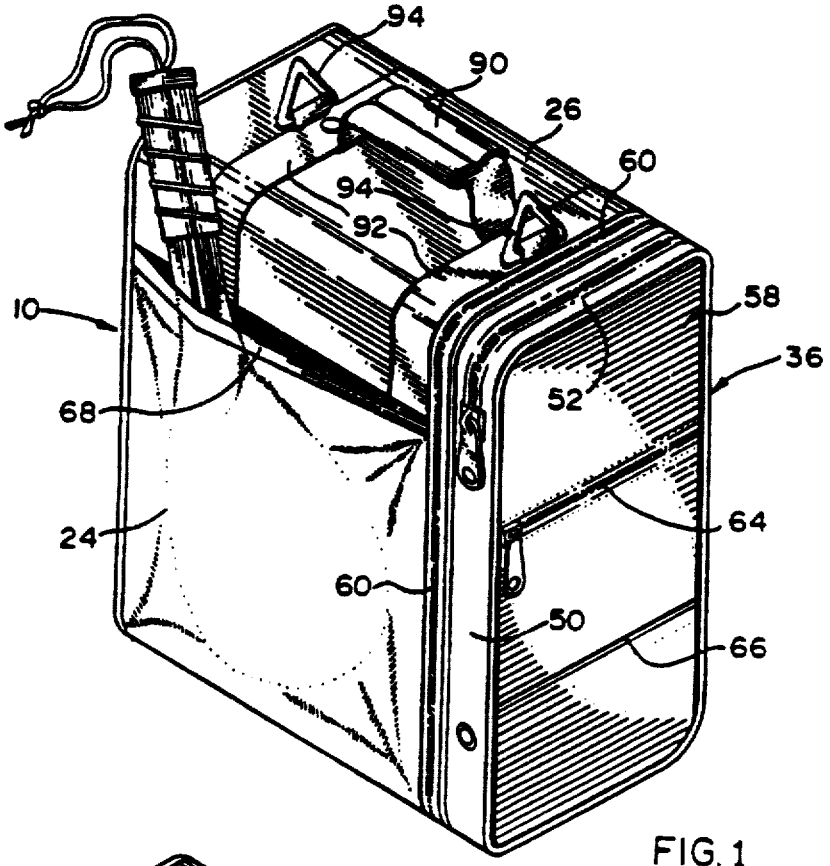
FIG. 1a is pictorial representation of a novel, utility bag in accordance with the present invention.

A preferred embodiment of the utility bag of the present invention is illustrated in the drawings. The bag, shown generally by the reference numeral 10, includes a pair of transversely positioned, generally rectangular, rigid frame members 12 and 14 which are longitudinally spaced apart in substantially parallel configuration to form a forward frame member 12 and a rearward frame member 14. Each of the frame members 12 and 14 have parallel, elongate sides 16 which have equal longitudinal dimensions. Elongate, upper sides 18 and elongate, lower sides 20 join the respective upper and lower ends of the frame members 12 and 14. The upper and lower sides 18 and 20 of each respective frame member 12 and 14 have equal dimensions and are generally parallel with each other.

The mutually respective, upper ends of the sides 16 of each frame member 12 and 14 are contiguous with an elongate, upper side element 18, and the mutually respective, lower ends of the sides 16 are contiguous with an elongate, lower side element 20. Preferably, the juncture between the sides 16 and the upper and lower elements 18 and 20 have smooth, arcuate, exterior contours. The sides 16 and the upper and lower elements 18 and 20 of the respective frame members 12 and 14 are preferably formed from relatively narrow strips of sheet metal, but could, of course, be made of a different, suitable material such as molded or extruded polymeric material. The elongate dimensions of the upper and lower elements 18 and 20 are shorter than the corresponding, elongate dimensions of the sides 16. Preferably, the elongate dimensions of the each of the upper and lower elements 18 and 20 are between about one-third and two-thirds of the elongate dimension of the respective sides 16. The sides 16 and the upper and lower elements 18 of each frame member 12 and 14 are advantageously covered with a tubular slip cover made of a sheet of fabric or flexible polymeric material.

The exterior sides of the bag 10 are formed from fabric panels. As illustrated, a fabric side panel forms the longitudinal sides of the bag 10. The fabric side panel comprises a first cloth panel portion 24 extending along mutually respective, spaced, sides 16 of the longitudinally spaced frame members 12 and 14. The first cloth panel 24 forms one longitudinal side of the utility bag 10. A second cloth panel portion 26 of the fabric side panel extends along mutually respective, spaced, upper sides 18 of the longitudinally spaced frame members 12 and 14. The second cloth panel 26 forms the top wall of the utility bag 10. A third cloth panel portion 28 of the fabric side panel extends along mutually respective, spaced sides 16 of the longitudinally spaced frame members 12 and 14. The third cloth panel 28 forms the other longitudinal side of the utility bag 10. A forth cloth panel portion 30 of the fabric side panel extends along mutually respective, spaced lower sides 20 of the longitudinally spaced frame members 12 and 14. The fourth cloth panel 30 forms the bottom wall of the utility bag 10.

The fabric side panel comprising the cloth panels 24–30 advantageously is formed of a single, elongate piece of cloth which tautly envelopes the frame members 12 and 14 on the outside surfaces thereof. It is to be recognized, however, that the fabric side panel could be formed of four separate cloth panels 24–30 sewed together in essentially end-to-end fashion to form the composite fabric side panel enveloping the frame members 12 and 14. Whether formed of four cloth panels sewed together or of one continuous piece of cloth, the enveloping side panel is joined, as by sewing, to itself at its opposite ends and along the width of the cloth panel to form the top wall, bottom wall and opposite sidewalls of the bag 10, wherein the top wall is substantially parallel with the bottom wall, and the sidewalls are substantially parallel with each other. The enveloping fabric side panel has a width and is positioned such that the forward and rearward edges of the component cloth panels 24–30 extend beyond the opposing, outside edges of the respective, space frame members 12 and 14. Preferably, the forward edges of the cloth panels 24–30 extend to a position which is closely adjacent to the forward frame member 12, and the rearward edges of the cloth panels 24–30 extend to a position which is space beyond the rearward frame member 14. In a particularly preferred embodiment of the invention, the rearward edges of the cloth panels 24–30 are spaced beyond the rearward frame member 14 by a distance of at least about one-fifth and no greater than about one-third the distance between the spaced apart, forward and rearward frame members 12 and 14. Flexible panel material 27 is attached to the framework to form an abutting top wall, a bottom wall, sidewalls, and forming a generally rectangular end wall to define a generally rectangular cavity therein.

A generally rectangular, fabric, end panel 34 is attached at its opposite edges to the rearward extending edges of the cloth panels 24–30 to form a closed rear end wall of the utility bag 10. An outwardly swinging, generally rectangular, fabric door 36 is attached to the forward extending edges of the cloth panels 24–30 to form a closure for the front end of the utility bag 10. The fabric door 36 is attached in hinge-like fashion along one of its elongate, vertical edges to a corresponding, vertical, forward, side wall edge of a side cloth panel 28. An interengaging zipper closure means is attached to the forward edge portions of the forward side wall edges of the remaining three cloth panels 24, 25 and 30, as well as to the other three side edges of the fabric door 36 for releasably securing the fabric door 36 in a closed position at the front end of the utility bag.

In the preferred embodiment as illustrated in the drawings, the door comprises a generally rectangular, fabric, inner end panel 38 which has substantially parallel side edges and substantially parallel top and bottom edges. The panel 38 has substantially the same rectangular shape and dimensions as the pair of rigid frame members 12 and 14 of the bag 10. A cloth hinge means 40 attaches a side edge of the inner door panel 38 to the forward, vertical edge of side panel 38 of the bag 10.

A generally rectangular, shape retaining rod member 42 is provided adjacent to the perimeter of the inner end panel 38. Preferably, the rod member 42 is sewn into a position adjacent the perimeter of the inner end panel 38 in the manner of a conventional piping. The rod member 42 supplies shape retaining characteristics, stability and strength to the fabric door 36.

The door 36 has exterior sides which are formed from fabric panels. As illustrated, a fabric side panel forms the longitudinal sides of the door 36. The fabric side panel comprises a first cloth panel portion 50 extending along a mutually respective side edge of the inner end panel 38 of the door 36. As shown in the drawings, the first cloth panel 50 forms one longitudinal side of the door 36. A second cloth panel portion 52 of the fabric side panel extends along a mutually respective, upper side edge of the inner end panel 38 of the door 36. The second cloth panel 52 forms the longitudinal top wall of the door 36. A third cloth panel portion 54 of the fabric side panel of the door 36 extends along the other, mutually respective, side edge of the inner end panel 38 of the door 36. The third cloth panel 54 forms the other longitudinal side of the door 36. A fourth cloth panel portion 56 of the fabric side panel extends along the mutually respective, lower side of the inner end panel 38 of the door 36. The fourth cloth panel 56 forms the bottom wall of the door 36.

The fabric side panel comprising the cloth panels 50–56 is advantageously formed of a single, elongate piece of cloth which is maintained in a substantially rectangular configuration by the rod member 42 positioned adjacent to the perimeter of the inner end panel 38 of the door 36. It is to be recognized, however, that the fabric side panel could be formed of four separate cloth panels 50–56 sewed together in essentially end-to-end fashion to form the composite fabric side panel of the door 36. Whether formed of four cloth panels sewed together or of one continuous piece of cloth, the side panel of the door 36 is joined, as by sewing, to itself at its opposite ends and along the width of the cloth panel to form the top, bottom and opposite sides of the door 36, wherein the top of the door is substantially parallel with the bottom door, and the sides of the door 36 are substantially parallel with each other.

A closed, forward end wall is provided for the door 36. This end wall comprises a generally rectangular, outer, end panel 58 which has subsequentially the same shape and demensions as the inner end panel 38 of the door 36. The perimeter edges of the outer end panel 58 is attached, as by sewing, to the mutually respective, otherwise free, extending side edges of the side panels 50–56 of the door 36. The door 36 thus including a generally rectangular pouch which is enclosed by the inner end panel 38, the outer end panel 58 and the side panels 50–56.

The cloth from which the inner end panel 38, the outer end panel 58 and the side panels 50–56 of the door 36 is preferably of the type having a rubberized or otherwise water proof inner surface facing inwardly of the pouch formed in the door 36. This advantageously permits wet items, such as wet swimming suits, damp towels, etc., to be placed in the pouch out of contact with the other items carried in the bag 10. Because of the water barrier formed by the cloth from which the door 36 is made, the other items in the bag 10 can be maintained in a dry condition when wet items are isolated in the pouch formed in the door 36.

An elongate opening is provided in the top wall portion 52 of the door 36 for access to the pouch formed in the door 36. The opening preferably extends completely across the longitudinal length of the top wall panel 52 and downwardly a relative short distance on both the side panels 50 and 54. A closure means, preferably comprising a zipper closure 60, is provided in combination with the opening for releasably closing the opening in the top portion 52 of the door 36.

Advantageously, at least one outer pocket 64 is provided on the exterior face of the outer end panel 58 of the door 36 for carrying various small items. Preferably, the pocket 64 is provided with a zipper closure. As illustrated in the drawings, a second smaller pocket 66 can be provided on the exterior face of the outer end panel 58 of the door 36. Generally, the second pocket 66 and any subsequent pockets on the exterior face of the outer end panel 58 are open at their tops and are not provided with closure means.

In the preferred embodiment, as illustrated, a plurality of pocket 62 are provided on the face of the inner end panel 38 of the door 36. The pocket 62 can be of various sizes and shapes and are preferably open at their tops. The pocket 62 are used to advantage for carrying various grooming items, such as brushes, combs, mirrors, lotion bottles, toothbrush, shaver, etc. A larger side pocket 68 can be provided on the exterior face of one of the sidewalls (sidewall 24 as shown in FIG. 1 of the drawings) of the bag 10 for carrying larger items such as rackets and other sports equipment.

It is further advantageous to provide a folding, generally rigid, divider panel 70 within the interior of the bag 10 as shown in the drawings. The divider panel 70, when positioned in its unfolded, horizontal position, divides the interior of the bag 10 into separate upper and lower chambers. The divider panel 70 is conveniently held in place by two fabric straps 72 and 74 which extent between the vertical legs of the respective frame members 12 and 14. The first divider strap 72 is attached at its opposite ends to the rearward frame member 14. The second divider strap 74 has its opposite ends sewed to the opposite sides of the bag 10 at a point near the upper end of the bag 10 and adjacent to the forward frame member 12. The end portions of the second divider strap 74 extend down along the sides of the forward frame member to a position intermediate the height of the bag and at a point within a horizontal plane passing through the bag 10 at which the divider panel 70 is to be positioned when in its working, unfolded position. The intermediate portion of the second divider strap 74 extend across the interior of the bag 10 to form a support for the front end of the divider panel 70 when the divider panel is in its working, unfolded position. The intermediate portion of the second divider strap 74 is preferably attached to the underside of the front end of the divider panel 70 by an appropriate fastening device such as a broad-headed rivet 78.

Figure 2:
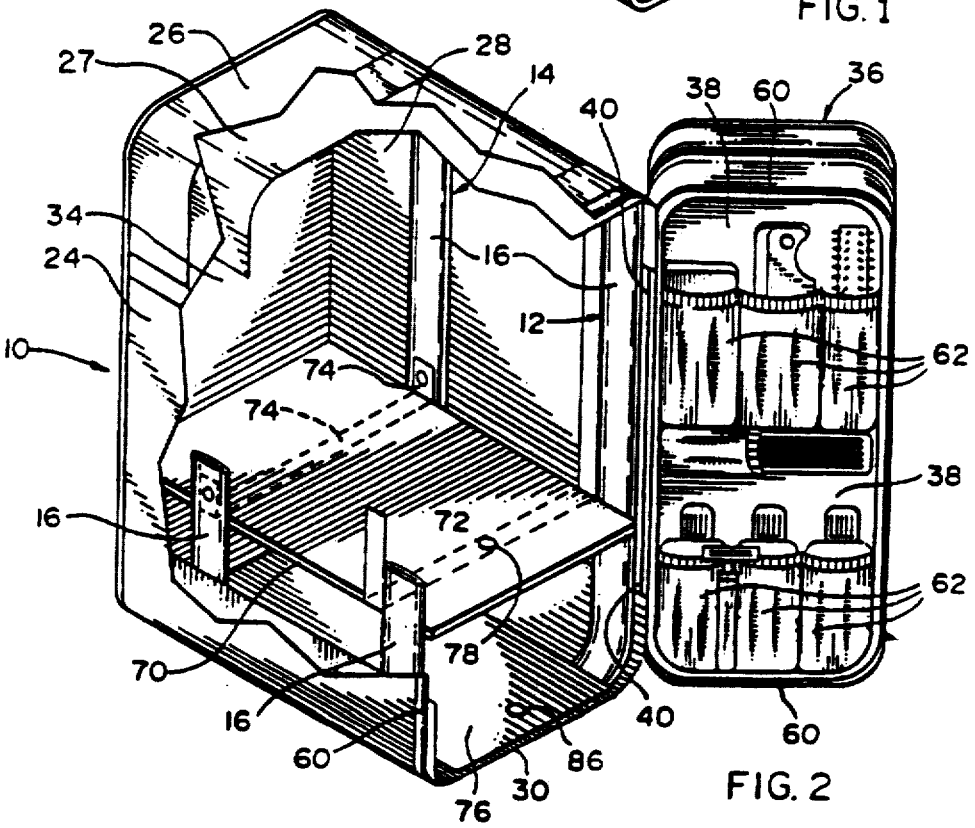
FIG. 2 is a pictorial representation similar to that of FIG. 1 but showing the end door of the utility bag open and showing portions of the sidewalls of the bag cut away to illustrate internal structure.
Figure 3:
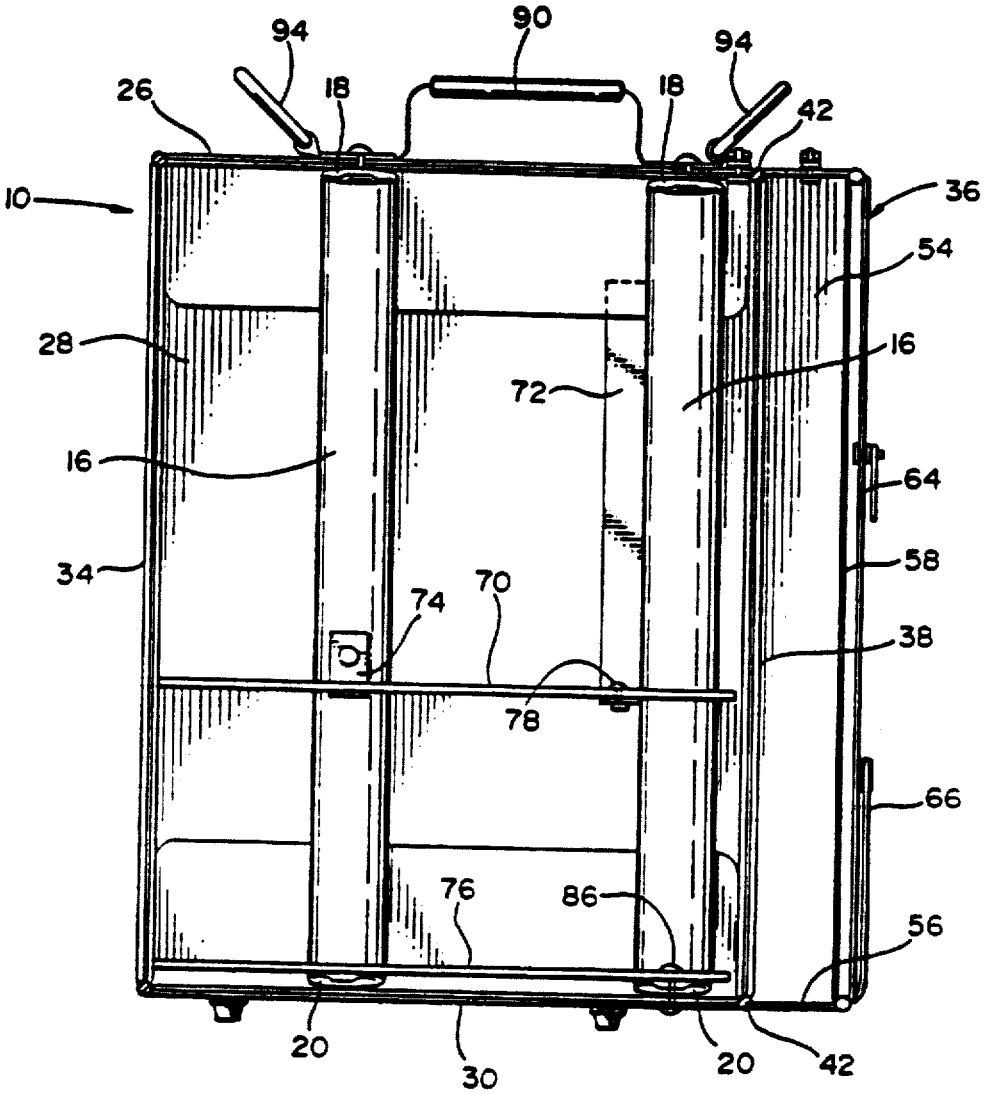
FIG. 3 is a vertical cross section taken along line 3—3 of FIG. 1.

The divider panel 70 is shown in its unfolded, working position in FIGS. 2 and 3 of the drawings, and, as shown, the divider panel 70 rests in a substantially horizontal plane on the two divider straps 72 and 74. If it is not desired to divide the bag 10 into two interior chambers, the divider panel 70 is folded up against the end panel 34 of the bag 10. This is conveniently done by lifting the forward end of the divider panel 70 upwardly from its support on the divider strap 74. The rearward end of the divider panel 70 is allowed to slide backwardly and downwardly over the rearward divider strap 72 to a position at which the rearward end of the divider panel 70 rests on the floor 76 of the bag 10. The forward end of the divider panel 70 is then pivoted toward the rearward end of the bag 10 until the divider panel 70 is positioned substantially adjacent to the end panel 34 of the bag.

As shown in FIGS. 2 and 3 of the drawings, the utility bag 10 is advantageously provided with two, elongate, generally U-shaped, stiffener or shape retainer sheets 80 and 82. The upper stiffener sheet 80 is positioned over the upper sides 18 of the forward and rearward frame members 12 and 14 so that the broad, base portion of the stiffener sheet 80 lies on top of the upper sides 18 of the frame members 12 and 14, and between the frame members and the top wall 26 of the bag 10. The downwardly directed legs of the U-shaped stiffener sheet 80 extend downwardly along the exterior side of the sides 16 of the frame members 12 and 14, between the frame members and the side panels 24 and 28 of the bag 10. The lower stiffener sheet 82 is positioned beneath the lower sides 20 of the forward and rearward frame members 12 and 14 so that the broad, base portion of the stiffener sheet 82 lies just below the lower sides 20 of the frame members 12 and 14, and between the frame members and the bottom wall 30 of the bag 10. The upwardly directed legs of the U-shaped stiffener sheet 82 extend upwardly along the exterior side of the sides 16 of the frame members 12 and 14, between the frame members and the side panels 24 and 28 of the bag 10. The stiffener sheets 82 are preferably made of polymeric material or paperboard material, but could also be made of sheet metal.

The utility bag 10 can also advantageously be provided with a floor panel 76 which, as shown in FIGS. 2 and 3 of the drawings, lies on the top of the lower sides 20 of the frame members 12 and 14. The floor member 76 is preferably made of a sheet of polymeric material or of paperboard, but could also be made of sheet metal. The floor member is advantageously attached to the lower sides 20 of the frame members 12 and 14 with appropriate fasteners such as broad-headed rivets 86.

A handle 90 is provided on the upper side of the bag 10. The handle 90 is advantageously sewed to the upper panel 26 of the bag. Reinforcement straps 92 can be sewed to the upper side of the bag 10 to reinforce the handle 90, and to distribute the weight of the bag over the area of the reinforcement straps. Attachment rings 94 can also be provided for attaching a shoulder strap (not shown) for carrying the bag on one's shoulder.

Although preferred embodiments of the utility bag 10 of the present invention have been illustrated and described, it is to be understood that the present disclosure is made by way of example and that various other embodiments are possible without departing from the subject matter coming within the scope of the following claims, which subject matter is regarded as the invention.

I claim:

1. A utility bag which is generally rectangular in shape and sized to fit into an athletic locker or under the seat of an airplane, said utility bag comprising:

(a) a pair of transversely positioned, generally rectangular, rigid frame members longitudinally spaced apart comprising a forward frame member and a rearward frame member, each frame member having parallel, elongate sides of equal dimensions having upper ends which are contiguous with an upper side and lower ends which are contiguous with a lower side such that said upper and lower sides are substantially parallel and substantially of the same dimensions, which dimensions are shorter than said elongate sides;

(b) a fabric side panel having a width such that the forward and rearward edges of said side panel extend beyond the opposing outside edges of said frame members respectively, said side panel tautly enveloping said frame members on the outside surfaces thereof, with said side panel being joined to itself at opposing ends and along the width thereof to form contiguous top wall bottom wall and sidewalls, wherein the top wall is substantially parallel with the bottom wall and the sidewalls are substantially parallel with each other;

(c) a generally rectangular fabric end panel attached at its edges to the rearward edges of said side panel to form a closed rear end wall;

(d) an outwardly swinging, generally rectangular fabric door [attached in hinge-like fashion] *hingedly-attached* along one elongate edge thereof to a sidewall edge of said forward edge of said side panel; and (e) an interengaging zipper closure means attached to the remaining edge portion of the forward edge of said side panel and the other three side edges of said rectangular fabric door for releasably securing the fabric door in a closed position to the front edge of said side panel.

2. A utility bag in accordance with claim 1, wherein the door comprises a generally rectangular, fabric, inner end panel having substantially parallel side edges and substantially parallel top and bottom edges, said inner end panel further having substantially the same dimensions as the pair of rigid frame members;

cloth hinge means attaching a side edge of said inner panel of said door to the sidewall edge of said forward edge of said side panel;

a generally rectangular rod member having substantially the same dimensions as the pair of rigid frame members, said rod member being sewn into a position adjacent the perimeter of said inner end panel of said door;

a fabric side edge panel having a width which is no greater than about one-third the distance between the spaced apart forward and rearward frame members, said side edge panel being attached to the perimeter of said inner end panel of said door to form contiguous door top wall, door sidewalls and door bottom wall, wherein the door top wall is substantially parallel with the door bottom wall and the door sidewalls are substantially parallel with each other;

a generally rectangular fabric outer end panel having substantially the same dimensions as said inner end panel of said door, said outer end panel being attached to the extending ends of said side edge panel of said door to form a closed forward end wall of said door, whereby said door includes a rectangular pouch enclosed by said inner end panel, outer end panel and side edge panel of said door;

an elongate opening in the top wall portion of said door for access to said pouch; and closure means for releasably closing said elongate opening in said top wall portion of said door.

3. A utility bag in accordance with claim 2, wherein at least one pocket is provided on the exterior face of said outer end panel of said door.

4. A utility bag in accordance with claim 3, wherein said one pocket on said outer end panel of said door is provided with a zipper closure.

5. A utility bag in accordance with claim 2, wherein the closure means for releasably closing said elongate opening in the top wall portion of said door comprises a zipper.

6. A utility bag in accordance with claim 2, wherein a plurality of pockets are provided on a face of said inner end panel of said door which faces the interior of said bag when the door is closed, said pockets being adapted to hold various grooming items.

7. A utility bag in accordance with claim 6, wherein [at least one other] *a second* pocket is provided on the exterior face of said outer end panel of said door.

8. A utility bag in accordance with claim 7, wherein said one other pocket on said outer end panel is provided with a zipper closure.

9. A utility bag in accordance with claim 3, wherein a second other pocket is provided on the exterior face of said outer end panel of said door.

10. A utility bag in accordance with claim 7, wherein a second other pocket is provided on the exterior face of said outer end panel of said door.

11. A utility bag in accordance with claim 7, wherein a side pocket is provided on the exterior face of a sidewall of said bag.

12. A utility bag in accordance with claim 6, wherein a folding, generally rigid, divider panel is provided in said bag to divide the interior of the bag into upper and lower chambers.

13. A utility bag in accordance with claim 7 wherein a folding, generally rigid, divider panel is provided in said bag to divide the interior of the bag into upper and lower chambers.

14. A utility bag in accordance with claim 1, wherein a plurality of pockets are provided on a face of said door which faces the interior of said bag when the door is closed, said pockets being adapted to hold various grooming items.

15. A utility bag in accordance with claim 1, wherein a folding, generally rigid, divider panel is provided in said bag to divide the interior of the bag into upper and lower chambers.

16. A utility bag in accordance with claim 1, wherein an elongate, generally U-shaped, stiffener sheet is positioned between the pair of frame members and the top wall and sidewalls of said bag.

17. A *utility* bag in accordance with claim 1, wherein a second elongate, generally U-shaped, stiffener sheet is positioned between the pair of frame members and the bottom wall and sidewalls of said bag.

18. A utility bag in accordance with claim 1, wherein a generally rigid floor panel is positioned on the bottom sides of said pair of frame members.

19. A utility bag in accordance with claim 1, wherein a handle is provided on the exterior face of said top wall of said bag.

20. A utility bag in accordance with claim 1, wherein a side pocket is provided on the exterior face of a sidewall of said bag.

21. A utility bag in accordance with claim 1, wherein the dimensions of said upper and lower sides of the frame members are between about one-third and two-thirds of the dimension of said elongate sides of the frame members.

22. A utility bag in accordance with claim 1, wherein said forward edges of the fabric side panel are positioned closely adjacent to the forward frame member, and said rearward edges of the fabric side panel extend beyond the rearward frame member by a distance of at least [on-fifth] *one-fifth* and no greater than about [on-third] *one-third* of the distance between the spaced apart, forward and rearward frame members.

*23. A utility bag which is generally rectangular in shape and sized to fit into an athletic locker or under the seat of an airplane, said utility bag comprising:*

*(a) a framework;*

*(b) flexible panel material attached to the framework to form an abutting top wall, a bottom wall, and sidewalls, and flexible panel material forming a generally rectangular end wall defining a generally rectangular cavity therein having a generally rectangular opening on one side, wherein the top wall is substantially parallel with the bottom wall and wherein the sidewalls are substantially parallel with each other;*

*(c) an outwardly swinging, generally rectangular door attached along one vertical edge thereof to a vertical edge of one of the sidewalls of the opening; and*

*(d) means for releasably securing the door to close the opening.*

*24. A utility bag which is generally rectangular in shape and sized to fit into an athletic locker or under the seat of an airplane, said utility bag comprising:*

*(a) a framework comprising one or more support members, the member or members configured or positioned to define a generally rectangular cavity therein providing at least one generally rectangular opening, wherein the resulting framework defines spans for side panels substantially parallel to each other and wherein the resulting spans form top panels and bottom panels which are substantially parallel to each other;*

*(b) flexible panel material attached to the framework to form in abutment a top wall, a bottom wall, and sidewalls, and flexible panel material forming an end wall leaving at least one opening in the rectangular cavity unclosed, wherein the top wall is substantially parallel with the bottom wall and wherein the sidewalls are substantially parallel with each other;*

*(c) an outwardly swinging, generally rectangular door attached along one vertical edge thereof to a vertical edge of one of the sidewalls forming the unclosed opening; and*

(*d*) *means for releasably securing the door to close the opening.*

*25. A utility bag which is generally rectangular in shape and sized to fit into an athletic locker or under the seat of an airplane, said utility bag comprising:*

(*a*) *a framework comprising one or more means for supporting a top member and a bottom member to define a generally rectangular cavity therein providing at least one generally rectangular opening, wherein the resulting framework defines spans for side panels substantially parallel to each other and spans for top and bottom panels which are substantially parallel to each other;*

(*b*) *flexible panel material attached to the framework to form in abutment a top panel, a bottom panel, and side panels, and wherein the flexible panel material forms a generally rectangular end panel leaving at least one opening of the rectangular cavity unclosed;*

(*c*) *an outwardly swinging, generally rectangular door attached to a vertical edge of one of the side panels forming the unclosed opening; and*

(*d*) *means for releasably securing the door to close the opening.*

*26. A utility bag which is generally rectangular in shape and sized to fit into an athletic locker or under the seat of an airplane, said utility bag comprising:*

(*a*) *a framework comprising one or more means for supporting a top member and a bottom member defining a generally rectangular cavity therein with diametrically opposing openings comprising a first opening and a second opening, wherein the means for supporting the top member and bottom member defines side members substantially parallel to each other and wherein the top member and the bottom member are substantially parallel to each other;*

(*b*) *flexible panel material substantially coextensive with and attached to the top member, bottom member, and each side member to form in abutment a top wall, a bottom wall, and sidewalls, wherein the top wall is substantially parallel with the bottom wall and wherein the sidewalls are substantially parallel with each other without closing the openings;*

(*c*) *a generally rectangular fabric end panel attached at its edges to the edge of the sidewalls to form an end wall closing the first opening;*

(*d*) *an outwardly swinging generally rectangular door attached along the vertical edge thereof to a vertical edge of one of the sidewalls of the second opening; and*

(*e*) *means for releasably securing the door to close the second opening.*

* * * * *